(12) United States Patent
Siess (10) Patent No.: US 11,199,450 B2
(45) Date of Patent: Dec. 14, 2021

(54) OPTICAL SENSOR AND METHOD FOR DETECTING ELECTROMAGNETIC RADIATION

(71) Applicant: ams AG, Premstaetten (AT)

(72) Inventor: Gunter Siess, Kraftsdorf (DE)

(73) Assignee: AMS AG, Premstätten (AT)

( * ) Notice: Subject to any disclaimer, the term of this patent is extended or adjusted under 35 U.S.C. 154(b) by 50 days.

(21) Appl. No.: 16/613,353

(22) PCT Filed: May 8, 2018

(86) PCT No.: PCT/EP2018/061818
§ 371 (c)(1),
(2) Date: Nov. 13, 2019

(87) PCT Pub. No.: WO2018/210623
PCT Pub. Date: Nov. 22, 2018

(65) Prior Publication Data
US 2020/0149967 A1    May 14, 2020

(30) Foreign Application Priority Data
May 16, 2017 (EP) .................................. 17171339

(51) Int. Cl.
*G01J 3/46* (2006.01)
*G01J 3/51* (2006.01)

(52) U.S. Cl.
CPC ............. *G01J 3/465* (2013.01); *G01J 3/513* (2013.01)

(58) Field of Classification Search
CPC ........... G01J 3/465; G01J 3/513; G01N 21/25
See application file for complete search history.

(56) References Cited

U.S. PATENT DOCUMENTS

| | | | |
|---|---|---|---|
| 3,645,633 A * | 2/1972 | Kisatsky | ................... G01J 3/46 356/406 |
| 7,170,644 B2 | 1/2007 | Loce et al. | |
| 2006/0119849 A1* | 6/2006 | Levey | ................... G01J 3/0256 356/419 |
| 2007/0241260 A1* | 10/2007 | Jaeger | ................. H01L 31/1013 250/214.1 |
| 2010/0091286 A1 | 4/2010 | Dahlgren | |

(Continued)

FOREIGN PATENT DOCUMENTS

| | | |
|---|---|---|
| EP | 1521069 | 4/2005 |
| TW | 201112183 | 4/2011 |

OTHER PUBLICATIONS

European Patent Office, International Search report for PCT/EP2018/061818, dated Aug. 20, 2018.

(Continued)

*Primary Examiner* — Hina F Ayub
(74) *Attorney, Agent, or Firm* — MH2 Technology Law Group LLP (57) ABSTRACT

An optical sensor comprises at least four detection channels, where each detection channel comprises a photodetector and a filter with a respective transmission spectrum. The transmission spectra of the at least four filters are different from one another, and the transmission spectra are set such that each of the three CIE color matching functions is a linear combination of the transmission spectra of at least two of the filters. Furthermore, a method for detecting electromagnetic radiation is provided.

19 Claims, 7 Drawing Sheets

(56) References Cited

U.S. PATENT DOCUMENTS

2010/0208266 A1    8/2010  Shannon et al.
2017/0370774 A1*  12/2017  Uematsu .................. G01J 3/51
2021/0003452 A1*   1/2021  Ashdown ............... A01G 7/045

OTHER PUBLICATIONS

Wharmby, D. O.: "Improvements in the use of filter colorimeters" Journal of physics e. scientific instruments, IOP Publishing, Bristol, GB vol. 8, No. 1; Jan. 1, 1975.

Nyström, D., "Reconstructing Spectral and Colorimetric Data Using Trichromatic and Multi-channel Imaging", 9th International Symposium on Multispectral Color Science and Application, Jan. 1, 2007, pp. 45-52.

Office Action issued in European Application No. 17171339.9, dated Feb. 7, 2020, 7 pages.

European Office Action in corresponding European Application No. 17171339.9 dated Apr. 23, 2021, 7 pages.

* cited by examiner

OPTICAL SENSOR AND METHOD FOR DETECTING ELECTROMAGNETIC RADIATION

CROSS-REFERENCE TO RELATED APPLICATIONS

The present application is the national stage entry of International Patent Application No. PCT/EP2018/061818, filed on May 8, 2018, which claims the benefit of priority of European Patent Application No. 17171339.9, filed on May 16, 2017, all of which are hereby incorporated by reference in their entirety for all purposes.

BACKGROUND OF THE INVENTION

The present application relates to an optical sensor and a method for detecting electromagnetic radiation.

In the field of color measurement the color impression of a light source for the human eye can be measured. The three CIE (International Commission on Illumination, CIE: Commission internationale de l'eclairage) color matching functions represent the spectral sensitivity of the human eye. For each color sensed by a human observer three tristimulus values can be determined. The tristimulus values give the color locus of the light of a light source in a color space. The tristimulus values can be determined by employing three sensors with different filters, respectively. The sensitivities of the three filters are adapted to one the three CIE color matching functions, respectively. The tristimulus values are given by the integrated signals of each of the three sensors. This means, the spectral composition of the light is not relevant for determining the color locus. The accuracy of the measurement of the color impression depends on how well the sensitivities of the three filters resemble the CIE color matching functions.

However, for remissive samples it is possible that the color of one sample may appear different under different illuminations. It is also possible that two samples have the same color impression under one illumination and a different color impression under a different illumination. These phenomena are referred to as metamerism. Metamerism can occur if the spectral composition of two different light sources is different or if the spectral composition of light reflected from two different samples is different. Differences in spectral compositions are not detected by determining the tristimulus values. This means, it is also not possible to determine if a light source has a continuous spectrum or a spectrum comprising different peaks.

SUMMARY OF THE INVENTION

In one embodiment of the optical sensor, the optical sensor comprises at least four detection channels, where each detection channel comprises a photodetector and a filter with a respective transmission spectrum. The at least four photodetectors are capable of detecting electromagnetic radiation. Preferably, the four photodetectors are capable of detecting light in the visible range, which means approximately between 380 nm and 780 nm. The photodetectors can be, for example, optical sensors such as charge coupled devices, complementary metal oxide semiconductor devices or photo diodes.

The at least four filters are optical filters.

Electromagnetic radiation with a wavelength within the transmission spectrum of a filter is passed by the respective filter. Electromagnetic radiation with a wavelength outside of the transmission spectrum of a filter is attenuated or completely blocked by the respective filter. Preferably, the transmission spectra of the filters each comprise one transmission peak.

For each detection channel one filter is arranged above one photodetector in such a way that only electromagnetic radiation which passes the filter reaches the photodetector.

The transmission spectra of the at least four filters are different from one another. This means, that the wavelength of maximum transmission can be different for each filter. It is also possible that the shapes of the transmission spectra of the filters are different from another. It is further possible that the full width at half maximum of the transmission spectra is different for the filters. However, it is possible that the transmission spectra of two or more filters overlap.

The transmission spectra are set such that each of the three CIE color matching functions is a linear combination of the transmission spectra of at least two of the filters. The three CIE color matching functions describe the color sensitivity of a human observer. The CIE color matching functions can also be referred to as the CIE tristimulus functions, the tristimulus curves or the photopic sensitivity functions. The first CIE color matching function comprises two peaks in the visible range between 380 nm and 780 nm and is referred to as $\bar{x}$ or the red curve. The second CIE color matching function comprises one peak in the visible range and is referred to as $\bar{y}$ or the green curve. The third CIE color matching function comprises one peak in the visible range and it is referred to as $\bar{z}$ or the blue curve.

A linear combination of at least two transmission spectra can be a scaled addition of the at least two transmission spectra. This means, each transmission spectrum is multiplied with a scaling factor and the transmission spectra multiplied with a scaling factor are summed up. Each of the three CIE color matching functions can in this way be represented by the scaled transmission spectra of at least two filters. The linear combination of at least two transmission spectra gives approximately one of the CIE color matching functions. Approximately means in this case that the linear combination does not necessarily result in exactly one of the CIE color matching functions. The linear combination of at least two transmission spectra can slightly deviate from one of the CIE color matching functions. But the linear combination of at least two transmission spectra closely resembles one of the CIE color matching functions.

Each of the three CIE color matching functions can be approximated by a linear combination of the transmission spectra of at least two of the filters. This means, that for each CIE color matching function one linear combination of at least two transmission spectra resembles the respective CIE color matching function, is nearly identical to the respective CIE color matching function or is identical to the respective CIE color matching function.

It is also possible that a linear combination of three or more transmission spectra of three or more filters gives one of the CIE color matching functions.

The transmission spectra of the filters are determined by the properties of the filters. The properties of the filters are set in such a way that each of the three CIE color matching functions is a linear combination of the transmission spectra of at least two of the filters.

Preferably, the optical sensor comprises at least six detection channels and at most 12 detection channels.

Preferably, the transmission spectra of the filters are distributed over the visible range between 380 nm and 780 nm. Also optionally, the transmission spectra are approximately equally spaced from each other. This means, the wavelengths of maximum transmission are optionally approximately equally spaced from each other.

As the transmission spectra of the filters can give linear combinations of the CIE color matching functions, the tristimulus values of a light source or of electromagnetic radiation detected by the optical sensor can be determined. For the optical sensor described here the tristimulus values are determined from the signals detected by the photodetectors. For each linear combination the integrated signal of each photodetector is multiplied with the scaling factor of the respective filter. The signals of the photodetectors can be for example the intensity of the detected electromagnetic radiation in dependence of the wavelength of the detected electromagnetic radiation. For each linear combination the sum of the signals of the respective photodetectors multiplied with their scaling factors gives the respective tristimulus value. With the three linear combinations the three tristimulus values can be determined.

Thus, for determining the tristimulus values, it is not required to employ one sensor with one filter with the sensitivity of one of the CIE color matching functions for each tristimulus value. Instead, at least two photodetectors with filters with different transmission spectra are employed for determining each tristimulus value.

Furthermore, with the optical sensor the spectral composition of a light source or of electromagnetic radiation can be analyzed. Preferably, the transmission spectra of the filters are distributed over the whole visible range of the electromagnetic spectrum and they are optionally overlapping only partially. In this way by means of suitable mathematical algorithms the spectrum of the electromagnetic radiation to be analyzed can be reconstructed and interpolated by matrix operations. Therefore, the transmission spectra of the filters need to be linearly independent which means that they overlap only partially. The reconstruction of the spectrum of the electromagnetic radiation to be analyzed enables remission measurements. This means, the color impression of a sample that is illuminated by a light source can be determined and the spectral composition of the light reflected at the sample can be reconstructed. It is further possible to compare reconstructed spectra with the color locus that is given by the corresponding three tristimulus values. This comparison is a plausibility test of the reconstruction of the spectra.

Consequently, the optical sensor combines the measurement of the color impression of a light source or electromagnetic radiation and the reconstruction of spectral information of a light source or of electromagnetic radiation. Therefore, the optical sensor described here enables to determine more information about the electromagnetic radiation to be analyzed than a sensor that determines either the color impression or the spectral composition. Metamerism and spectral information can be detected by the optical sensor. The determination of the color impression is more reliable for the optical sensor since also for example metamerism and other spectral information can be detected.

In one embodiment of the optical sensor each transmission spectrum is assigned a scaling factor for at least one linear combination yielding one of the CIE color matching functions. The scaling factors are set in such a way that each of the three CIE color matching functions is the linear combination of the transmission spectra of at least two of the filters. For a linear combination yielding one of the CIE color matching functions at least two transmission spectra are multiplied with their respective scaling factors and summed up. It is possible that for one linear combination yielding one of the CIE color matching functions not each transmission spectrum is assigned a scaling factor. This means, for example the first CIE color matching function referred to as $\bar{x}$, can be given by a linear combination of the transmission spectra of a first and of a second filter of the at least four filters. In this case only the first and the second filter are assigned a scaling factor for the linear combination yielding the first CIE color matching function. The same applies to the other two CIE color matching functions.

In one embodiment of the optical sensor the wavelength of maximum transmission is at least 380 nm and at most 780 nm for each filter. This means, the transmission spectra of the filters lie in the visible range of the electromagnetic spectrum.

In one embodiment of the optical sensor at least one transmission spectrum of one filter lies in the ultraviolet range and at least one further transmission spectrum of a further filter lies in the near infrared range.

In one embodiment of the optical sensor the transmission spectra are set such that at least one transmission spectrum is employed for the linear combinations of two CIE color matching functions. This means, for example the transmission spectrum of the second filter can be assigned a scaling factor for the linear combination of the first CIE color matching function and a further scaling factor for the linear combination of the second CIE color matching function $\bar{y}$. Advantageously, less detection channels are required if a transmission spectrum is employed for the linear combination of two CIE color matching functions. Furthermore, the detection channels are used in an efficient way if at least one transmission spectrum is employed for the linear combinations of two CIE color matching functions.

In one embodiment of the optical sensor the filters are one of the following:
  interference filters,
  absorption filters,
  plasmonic filters.

This means, all the filters are either interference filters or absorption filters or plasmonic filters. Interference filters can consist of several dielectric layers. For absorption filters electromagnetic radiation with wavelengths outside of the transmission spectrum of the filters is absorbed. Plasmonic filters can comprise structured metal layers that exhibit plasmonic properties.

In one embodiment of the optical sensor the filters are a combination of at least two of the following:
  interference filters,
  absorption filters,
  plasmonic filters.

This means, the optical sensor comprises at least two different filters where the at least two different filters are at least two of interference filters, absorption filters and plasmonic filters. It is also possible that the optical sensor comprises at least one interference filter, at least one absorption filter and at least one plasmonic filter.

The filters are not limited to any of the CIE 2° standard observer or the CIE 10° standard observer.

Furthermore, a method for detecting electromagnetic radiation is provided. The methods described optionally employ the optical sensor as described above. This means that all features disclosed for the optical sensor are also disclosed for the method for detecting electromagnetic radiation and vice versa.

According to at least one embodiment of the method for detecting electromagnetic radiation an optical sensor is provided which comprises at least four detection channels, where each detection channel comprises a photodetector. The optical sensor is the optical sensor as described above.

The method further comprises the step of providing a filter with a transmission spectrum for each detection channel, where the transmission spectra of the at least four filters are different from one another. The at least four filters are optical filters. Electromagnetic radiation with a wavelength within the transmission spectrum of a filter is passed by the respective filter. Electromagnetic radiation with a wavelength outside of the transmission spectrum of a filter is attenuated or completely blocked by the respective filter. Preferably, the transmission spectra of the filters each comprise one transmission peak. That the transmission spectra are different from one another means, that the wavelength of maximum transmission can be different for each filter. It is also possible that the shapes of the transmission spectra of the filters are different from another. It is further possible that the full width at half maximum of the transmission spectra is different for the filters. However, it is possible that the transmission spectra of two or more filters overlap.

The method further comprises the step of setting the transmission spectra of the at least four filters such that each of the three CIE color matching functions is a linear combination of the transmission spectra of at least two of the filters. A linear combination of at least two transmission spectra can be a scaled addition of the at least two transmission spectra. This means, each transmission spectrum is multiplied with a scaling factor and the transmission spectra multiplied with a scaling factor are summed up. Each of the three CIE color matching functions can in this way be represented by the scaled transmission spectra of at least two filters. The linear combination of at least two transmission spectra gives approximately one of the CIE color matching functions. Approximately means in this case that the linear combination does not necessarily result in exactly one of the CIE color matching functions. The linear combination of at least two transmission spectra can slightly deviate from one of the CIE color matching functions. But the linear combination of at least two transmission spectra closely resembles one of the CIE color matching functions.

It is also possible that a linear combination of three or more transmission spectra of three or more filters gives one of the CIE color matching functions.

The transmission spectra of the filters are determined by the properties of the filters. The properties of the filters are set in such a way that each of the three CIE color matching functions is a linear combination of the transmission spectra of at least two of the filters.

The method further comprises the step of detecting electromagnetic radiation to be emitted from a light source with the optical sensor, where each detection channel detects a fraction of the electromagnetic radiation in a range of wavelengths that is within the transmission spectrum of the respective filter and where each detection channel provides a channel signal. This means, that only the fraction of the electromagnetic radiation emitted from the light source is detected by the optical sensor which lies in the range of wavelengths that the optical sensor can detect. For example, the optical sensor can only detect electromagnetic radiation in the visible range.

For each detection channel one filter is arranged above one photodetector in such a way that only the fraction of the electromagnetic radiation which is passed by the filter reaches the photodetector.

The channel signals can be provided by the photodetectors. The channel signal of a detection channel can be for example the integrated intensity of electromagnetic radiation detected by the respective photodetector.

Therefore, with the method the spectral composition of a light source or of electromagnetic radiation can be analyzed. Preferably, the transmission spectra of the filters are distributed over the whole visible range of the electromagnetic spectrum and they are optionally overlapping only partially. This means, the different detection channels detect electromagnetic radiation wavelength-selective. The resolution of the optical sensor depends on the number of detection channels.

By means of suitable mathematical algorithms the spectrum of the electromagnetic radiation to be analyzed can be reconstructed and interpolated by matrix operations. It is further possible that the reconstruction relies on the measurement on representative targets and light sources. Moreover, it is possible that the matrix coefficients for the reconstruction algorithms are determined by theoretical assumptions. The transmission spectra of the filters need to be linearly independent which means that they overlap only partially. The reconstruction of the spectrum of the electromagnetic radiation to be analyzed enables remission measurements. This means, the color impression of a sample that is illuminated by a light source can be determined and the spectral composition of the light reflected at the sample can be reconstructed.

Consequently, the method for detecting electromagnetic radiation combines the measurement of the color impression of a light source or electromagnetic radiation and the reconstruction of spectral information of a light source or of electromagnetic radiation. Therefore, the method described here enables to determine more information about the electromagnetic radiation to be analyzed than a method that determines either the color impression or the spectral composition. Metamerism and the spectral composition can be detected by the method. The determination of the color impression is more reliable for the method described here since also for example metamerism and other spectral information can be detected.

According to at least one embodiment of the method each transmission spectrum is assigned a scaling factor for at least one linear combination yielding one of the CIE color matching functions. The scaling factors are set in such a way that each of the three CIE color matching functions is the linear combination of the transmission spectra of at least two of the filters. For a linear combination yielding one of the CIE color matching functions at least two transmission spectra are multiplied with their respective scaling factors and summed up. It is possible that for one linear combination yielding one of the CIE color matching functions not each transmission spectrum is assigned a scaling factor. This means, for example the first CIE color matching function referred to as $\bar{x}$, can be given by a linear combination of the transmission spectra of a first and of a second filter of the at least four filters. In this case only the first and the second filter are assigned a scaling factor for the linear combination yielding the first CIE color matching function.

The same applies to the other two CIE color matching functions.

According to at least one embodiment of the method the linear combination of the transmission spectra of at least two of the filters is the sum of at least two transmission spectra that are multiplied with their respective scaling factors. Each of the three CIE color matching functions is given by a combination of the transmission spectra of at least two of the filters. For each linear combination at least a first transmission spectrum is multiplied with its scaling factor and a second transmission spectrum is multiplied with its scaling factor. The at least two transmission spectra multiplied with their respective scaling factors are summed up. This sum gives one of the three CIE color matching functions or resembles one of the three CIE color matching functions.

According to at least one embodiment of the method the channel signal of each detection channel comprises the intensity of electromagnetic radiation detected by the respective detection channel. The channel signal can comprise the integrated intensity detected by the photodetector of the respective detection channel. The integrated intensity can be the intensity of the detected electromagnetic radiation integrated over the transmission spectrum of the respective filter.

According to at least one embodiment of the method at least two channel signals are multiplied with the respective scaling factors of the transmission spectra of the filters of the respective detection channels and added to give a tristimulus value. This means, a linear combination of at least two channel signals gives a tristimulus value. A tristimulus value gives the integrated intensity of the electromagnetic radiation to be analyzed that is detected by a detector with the sensitivity of one of the CIE color matching functions. The three tristimulus values describe the color impression of a light source or of electromagnetic radiation for a human observer.

If the channel signals comprise the integrated intensity detected by the photodetector of the respective detection channel, a linear combination of at least two channel signals gives a tristimulus value. For the linear combination each channel signal is multiplied with their respective scaling factor of the transmission spectrum of the filter. With the at least four channel signals of the at least four detection channels the three tristimulus values can be determined. The three tristimulus values give the color coordinates for a color locus in a color space.

It is further possible to compare reconstructed spectra with the color locus that is given by the corresponding tristimulus values. This comparison is a plausibility test of the reconstruction of the spectra.

According to at least one embodiment of the method at least one channel signal is employed for determining two tristimulus values. This means, the tristimulus values are not determined only by one channel signal but always by at least two channel signals. For example, the channel signal of the second detection channel can be assigned a scaling factor for determining a first tristimulus value and a further scaling factor for determining a second tristimulus value. In this case, the first tristimulus value can be given by the sum of the channel signal of a first detection channel multiplied with its scaling factor and the channel signal of the second detection channel multiplied with its first scaling factor. The second tristimulus value can be given by the sum of the channel signal of a third detection channel multiplied with its scaling factor and the channel signal of the second detection channel multiplied with its second scaling factor. It is also possible that more than two channel signals are employed for determining a tristimulus value. Advantageously, less detection channels are required if a channel signal is employed for determining two tristimulus values. Furthermore, the detection channels are used in an efficient way if at least one channel signal is employed for determining two tristimulus values.

According to at least one embodiment of the method a color measurement is provided which is based on the CIE color matching functions. A color measurement can give a measure for the color of a light source or for electromagnetic radiation perceived by a human observer. It is also possible that a color measurement gives a measure for the color impression for a human observer. The color measurement can for example provide color coordinates of a color locus in a color space of the light of a light source to be analyzed or of electromagnetic radiation. That the color measurement is based on the CIE color matching functions means that the sensitivity of the human eye is modeled by the CIE color matching functions. Therefore, for example the tristimulus values can be determined as described above giving a color measurement of a light source or of electromagnetic radiation.

According to at least one embodiment of the method a color measurement is provided which is based on color matching functions differing from the CIE color matching functions.

According to at least one embodiment of the method the three tristimulus values are determined. The three tristimulus values can be determined as described above, for example from the channel signals. With the three tristimulus values the color impression of light of a light source or of other electromagnetic radiation can be described and compared.

According to at least one embodiment of the method the wavelength of maximum transmission of at least one transmission spectrum is equal to the wavelength of maximum sensitivity of one of the CIE color matching functions. The transmission spectra of the at least four filters are set in such a way that each of the CIE color matching function is a linear combination of the transmission spectra of at least two of the filters. One possibility to set the transmission spectra in this way is to set the wavelength of maximum transmission of at least one transmission spectrum in such a way that it is equal to the wavelength of maximum sensitivity of one of the CIE color matching functions. It is also possible to set the wavelengths of maximum transmission of three transmission spectra equal to the wavelengths of maximum sensitivity of the three color matching functions, respectively. Preferably, the full width at half maximum of the transmission spectrum is smaller than the full width at half maximum of the respective CIE color matching function.

At least one further transmission spectrum can be set in such a way that it equals the difference between the transmission spectrum with the wavelength of maximum transmission that is equal to the wavelength of maximum sensitivity of one of the CIE color matching functions and the respective CIE color matching function. In this way, a linear combination of the transmission spectrum and the at least one further transmission spectrum gives the respective CIE color matching function.

According to at least one embodiment of the method the wavelength of maximum transmission of at least one transmission spectrum is approximately equal to the wavelength of maximum sensitivity of one of the CIE color matching functions. Approximately equal in this case means that the wavelength of maximum transmission of the at least one transmission spectrum can slightly differ from the wavelength of maximum sensitivity of one of the CIE color matching functions.

BRIEF DESCRIPTION OF THE DRAWINGS

The following description of figures may further illustrate and explain exemplary embodiments. Components that are functionally identical or have an identical effect are denoted by identical references. Identical or effectively identical components might be described only with respect to the figures where they occur first. Their description is not necessarily repeated in successive figures.

DETAILED DESCRIPTION

Figure 1A:
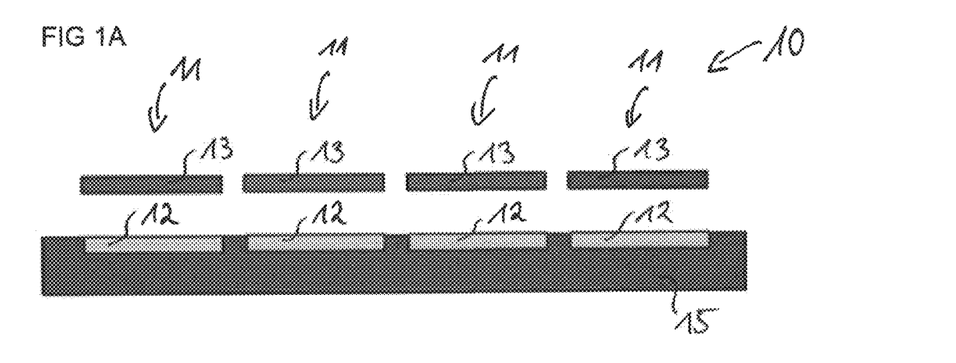
FIGS. 1A, 1B and 1C show cutaway views of exemplary embodiments of an optical sensor.

In FIG. 1A a cutaway view of an exemplary embodiment of an optical sensor 10 is shown. The optical sensor 10 comprises four detection channels 11. Each detection channel 11 comprises a photodetector 12 and a filter 13 with a respective transmission spectrum T. The filter 13 can be for example an interference filter, an absorption filter or a plasmonic filter. The photodetectors 12 are arranged next to each other on a carrier 15. Above each photodetector 12 a filter 13 is arranged. Between the photodetectors 12 and the filters 13 other optical elements or materials can be arranged. For each detection channel 11 one filter 13 is arranged above one photodetector 12 in such a way that only electromagnetic radiation which passes the filter 13 reaches the photodetector 12.

The transmission spectra T of the four filters 13 are different from one another and the transmission spectra T are set such that each of the three CIE color matching functions $\bar{x}, \bar{y}, \bar{z}$ is a linear combination of the transmission spectra T of at least two of the filters 13. Therefore, the tristimulus values X, Y, Z of a light source or of electromagnetic radiation detected by the optical sensor 10 can be determined. Furthermore, with the optical sensor 10 the spectral composition of a light source or of electromagnetic radiation can be analyzed.

Figure 1B:
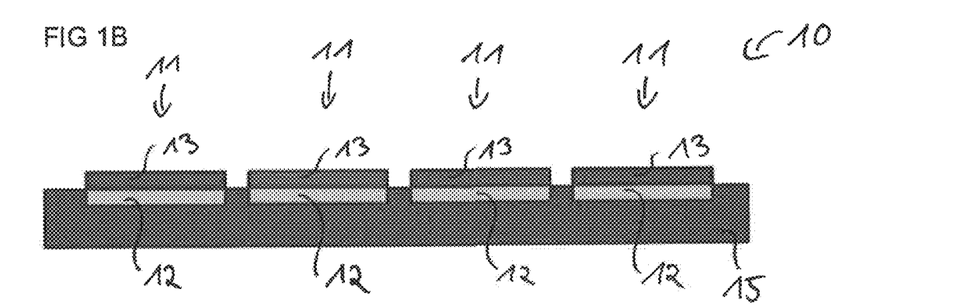

In FIG. 1B a cutaway view of a further embodiment of the optical sensor 10 is shown. The filters 13 are arranged directly above the photodetectors 12. This means, the filters 13 and the respective photodetectors 12 are in direct contact.

Figure 1C:
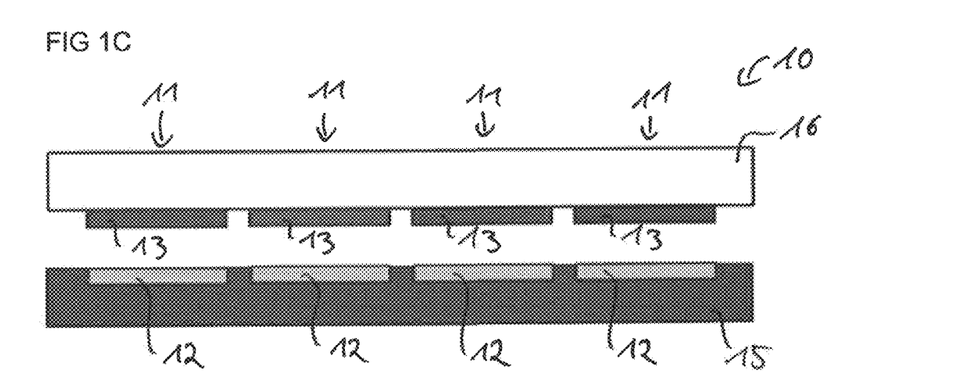

In FIG. 1C a cutaway view of a further embodiment of the optical sensor 10 is shown. Four filters 13 are arranged on a glass plate 16. The glass plate 16 is arranged at the side of the filters 13 that faces away from the photodetectors 12. Preferably, the glass plate 16 is transparent for the electromagnetic radiation to be detected by the photodetectors 12. Between the photodetectors 12 and the filters 13 optical elements or materials can be arranged.

Figure 2:
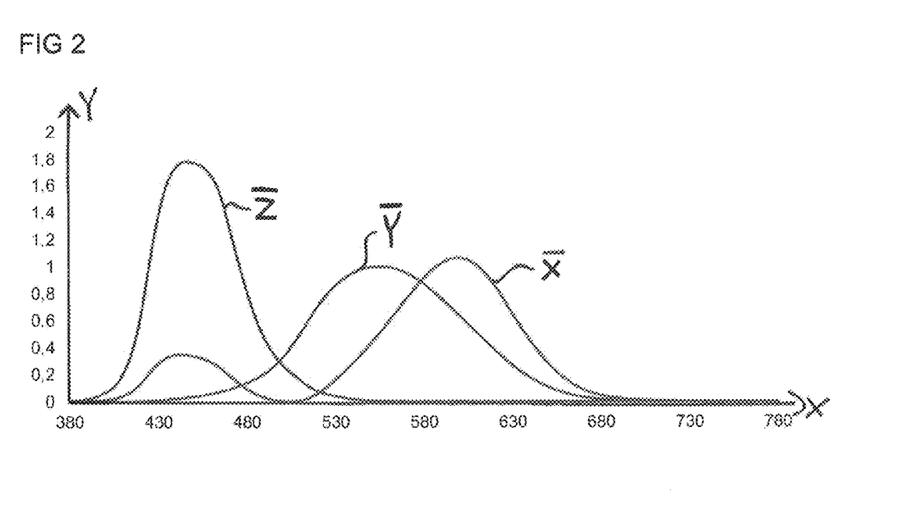
In FIG. 2 the three CIE color matching functions are shown.

In FIG. 2 the three CIE color matching functions $\bar{x}, \bar{y}, \bar{z}$ for a 10° standard observer are shown. On the x-axis the wavelength is plotted in nanometers and on the y-axis the sensitivity of the human eye is plotted in arbitrary units.

The first CIE color matching function comprises two peaks in the visible range between 380 nm and 780 nm and is referred to as $\bar{x}$ or the red curve. The second CIE color matching function y comprises one peak in the visible range and is referred to as $\bar{y}$ or the green curve. The third CIE color matching function comprises one peak in the visible range and is referred to as $\bar{z}$ or the blue curve. The CIE color matching functions $\bar{x}, \bar{y}, \bar{z}$ describe the color sensitivity of the human eye. The sum of the CIE color matching functions $\bar{x}, \bar{y}, \bar{z}$ is the spectral sensitivity of the so-called standard observer.

Figure 3:
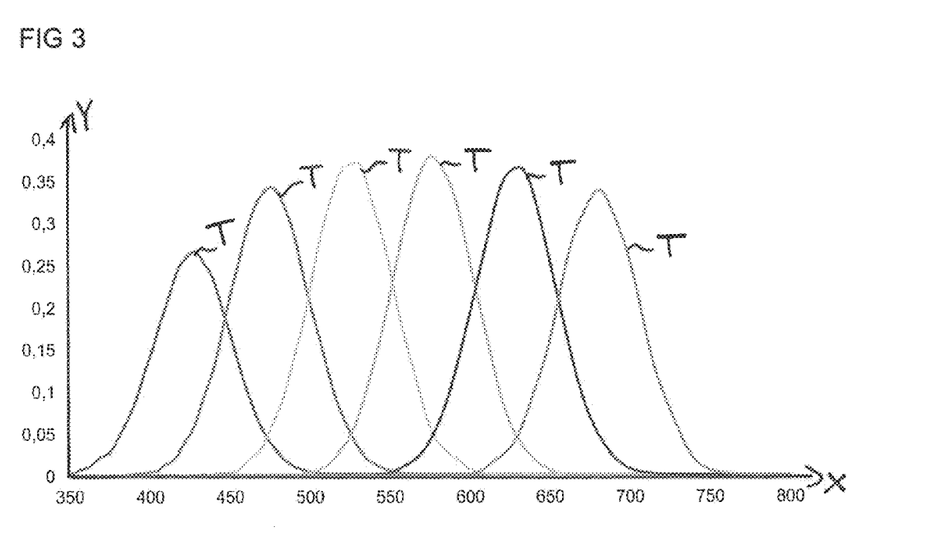
In FIG. 3 six transmission spectra of an optical sensor are shown.

In FIG. 3 six transmission spectra T of an optical sensor are shown. On the x-axis the wavelength is plotted in nanometers and on the y-axis the transmittance is plotted in arbitrary units. For this optical sensor the six transmission spectra T are equally distributed over the visible range of the electromagnetic spectrum. In contrast, as described with the following figures, for the optical sensor 10 described here the transmission spectra T are set such that each of the three CIE color matching functions $\bar{x}, \bar{y}, \bar{z}$ is a linear combination of the transmission spectra T of at least two of the filters 13.

Figure 4:
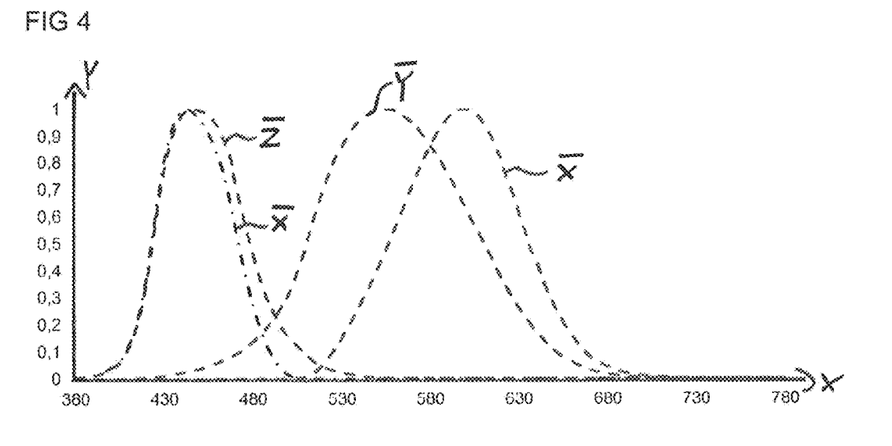
In FIG. 4 the normalized CIE color matching functions are shown.

In FIG. 4 the CIE color matching functions $\bar{x}, \bar{y}, \bar{z}$ normalized to 1 are shown. On the x-axis the wavelength is plotted in nanometers and on the y-axis the sensitivity of the human eye is plotted normalized to 1. The first CIE color matching function $\bar{x}$ is separated into two different peaks. The four peaks shown in FIG. 4 are in the following referred to as the four target functions Fx1, Fy, Fz, Fx2. The first target function Fx1, the second target function Fy, the third target function Fz and the fourth target function Fx2 represent the three CIE color matching functions $\bar{x}, \bar{y}, \bar{z}$ normalized to 1. According to the method described here the transmission spectra T of the at least four filters 13 are set such that each of the three CIE color matching functions $\bar{x}, \bar{y}, \bar{z}$ is a linear combination of the transmission spectra T of at least two of the filters 13. Therefore, the transmission spectra T of the filters 13 need to be set accordingly.

Figure 5A:
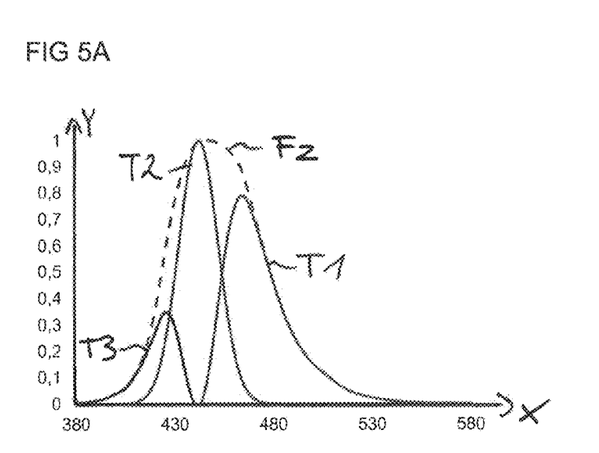
In FIGS. 5A and 5B three transmission spectra of three filters are shown.

In FIG. 5A the third target function Fz is plotted. Furthermore, a first transmission spectrum T1, a second transmission spectrum T2 and a third transmission spectrum T3 of three different filters 13 are plotted. On the x-axis the wavelength is plotted in nanometers and on the y-axis the transmittance is plotted normalized to 1. The x-axis and the y-axis are the same for all following figures. The three transmission spectra T1, T2, T3 are set in such a way that the sum of the three transmission spectra T1, T2, T3 gives the third target function Fz. Therefore, a linear combination of the three transmission spectra T1, T2, T3 gives the third CIE color matching function Z.

The transmission spectra T1, T2, T3 are set in such a way that the wavelength of maximum transmission of the second transmission spectrum T2 is equal or approximately equal to the wavelength of maximum sensitivity of the third target function Fz. The second transmission spectrum T2 is a Gauss function. The full width at half maximum of the second transmission spectrum T2 is smaller than the full width at half maximum of the third target function Fz. The first transmission spectrum T1 and the third transmission spectrum T3 are given by the difference between the third target function Fz and the second transmission spectrum T2.

Figure 5B:
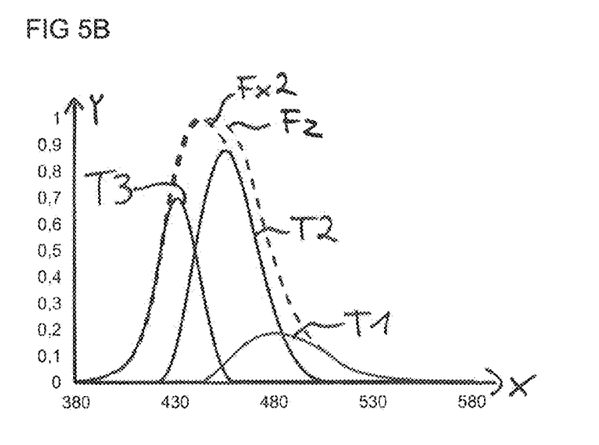

In FIG. 5B the third target function Fz and the fourth target function Fx2 are plotted. Furthermore, three transmission spectra T1, T2, T3 are plotted. The sum of the second transmission spectrum T2 and the third transmission spectrum T3 gives the fourth target function Fx2. The first transmission spectrum T1 is set to be the difference between the third target function Fz and the sum of the second transmission spectrum T2 and the third transmission spectrum T3. In this way, the third CIE color matching function $\bar{z}$ is given by the sum of the three transmission spectra T1, T2, T3 and the second peak of the first CIE color matching function $\bar{x}, \bar{y}, \bar{x}$ is given by the sum of the second transmission spectrum T2 and the third transmission spectrum T3.

With FIGS. 5A and 5B it is shown that the transmission spectra T of the at least four filters 13 are set in such a way that each of the three CIE color matching functions $\bar{x}, \bar{y}, \bar{z}$ is a linear combination of the transmission spectra T of two or three filters 13. It is also possible to employ more than three transmission spectra T for a linear combination yielding a CIE color matching function.

Figure 6A:
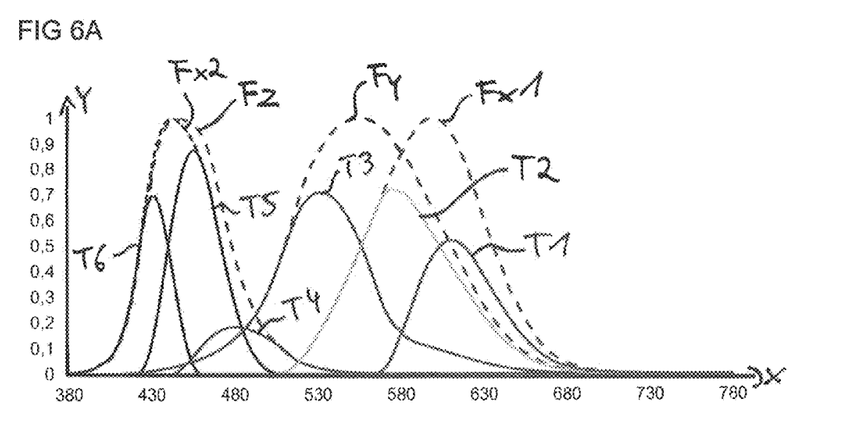
In FIGS. 6A and 6B six transmission spectra are shown.

In FIG. 6A the four target functions Fx1, Fy, Fz, Fx2 and six transmission spectra T1, T2, T3, T4, T5, T6 are plotted. The sum of the first transmission spectrum T1 and the second transmission spectrum T2 gives the first target function Fx1. The sum of the second transmission spectrum T2 and the third transmission spectrum T3 gives the second target function Fy. The sum of the fourth transmission spectrum T4, the fifth transmission spectrum T5 and the sixth transmission spectrum T6 gives the third target function Fz. The sum of the fifth transmission spectrum T5 and the sixth transmission spectrum T6 gives the fourth target function Fx2.

This means, the four target functions can be expressed in the following way:

$$Fx1 = T1 + T2$$

$$Fy = T2 + T3$$

$$Fz = T4 + T5 + T6$$

$$Fx2 = T5 + T6$$

Figure 6B:
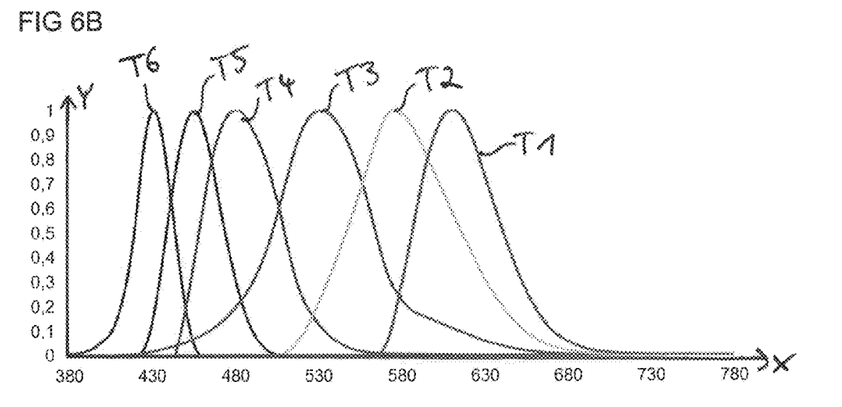

In FIG. 6B the six transmission spectra T1, T2, T3, T4, T5, T6 shown in FIG. 6A are plotted normalized to 1. These six transmission spectra T1, T2, T3, T4, T5, T6 of six filters 13 are set in such a way that each of the three CIE color matching functions $\bar{x}, \bar{y}, \bar{z}$ is a linear combination of the transmission spectra T of at least two of the filters 13. This means, that the scaled sum of at least two of the transmission spectra T gives one of the CIE color matching functions $\bar{x}, \bar{y}, \bar{z}$. Scaling factors c required for the linear combinations are determined from the summation shown in FIG. 6A. For example, the first transmission spectrum T1 and the second transmission spectrum T2 are scaled in such a way that their linear combination gives the first peak of the first CIE color matching function $\bar{x}$. This means, the first transmission spectrum T1 is multiplied with a first scaling factor c1 and the second transmission spectrum T2 multiplied with a second scaling factor c21. The sum of the first transmission spectrum T1 multiplied with the first scaling factor c1 and the second transmission spectrum T2 multiplied with the second scaling factor c21 gives the first peak of the first CIE color matching function $\bar{x}$.

The second transmission spectrum T2 is employed for the linear combinations of two CIE color matching functions $\bar{x}, \bar{y}, \bar{z}$. The sum of the second transmission spectrum T2 multiplied with a third scaling factor c22 and the third transmission spectrum T3 multiplied with a fourth scaling factor c3 gives the second CIE color matching function $\bar{y}$. Advantageously, less detection channels 11 are required if a transmission spectrum T is employed for the linear combination of two CIE color matching functions $\bar{x}, \bar{y}, \bar{z}$. Furthermore, the detection channels 11 are used in an efficient way if at least one transmission spectrum T is employed for the linear combinations of two CIE color matching functions $\bar{x}, \bar{y}, \bar{z}$.

Similarly, the fourth transmission spectrum T4, the fifth transmission spectrum T5 and the sixth transmission spectrum T6 are employed for the linear combination of the third CIE color matching function $\bar{z}$. Furthermore, the fifth transmission spectrum T5 and the sixth transmission spectrum T6 are employed for the linear combination of the second peak of the first CIE color matching function $\bar{x}$.

This means, the three CIE color matching functions $\bar{x}, \bar{y}, \bar{z}$ can be expressed by the following linear combinations:

$$\bar{x} = c1*T1 + c21*T2 + c51*T5 + c61*T6$$

$$\bar{y} = c22*T2 + c3*T3$$

$$\bar{z} = c4*T4 + c52*T5 + c62*T6,$$

where c1, c21, c22, c3, c4, c51, c52, c61, c62 are the respective scaling factors.

For the optical sensor 10 described here the tristimulus values X, Y, Z are determined from the signals detected by the photodetectors 12. For each linear combination the integrated signal of each photodetector 12 is multiplied with the scaling factor c of the respective filter 13. The signals of the photodetectors 12 can be for example the intensity of the detected electromagnetic radiation. For each linear combination the sum of the signals of the respective photodetectors 12 multiplied with their scaling factors c gives the respective tristimulus value X, Y, Z. With the three linear combinations the three tristimulus values X, Y, Z can be determined.

Consequently, with an optical sensor 10 with filters 13 with the transmission spectra T as shown in FIG. 6B the tristimulus values X, Y, Z of light of a light source or of electromagnetic radiation can be determined. This means, the color impression for a human observer can be determined. Furthermore, the spectral composition of electromagnetic radiation detected by the optical sensor 10 can be analyzed. As the six transmission spectra T are separated from each other the six detection channels 11 can be employed for analyzing the spectral composition of electromagnetic radiation and for a reconstruction of the spectrum of the electromagnetic radiation.

Figure 7A:
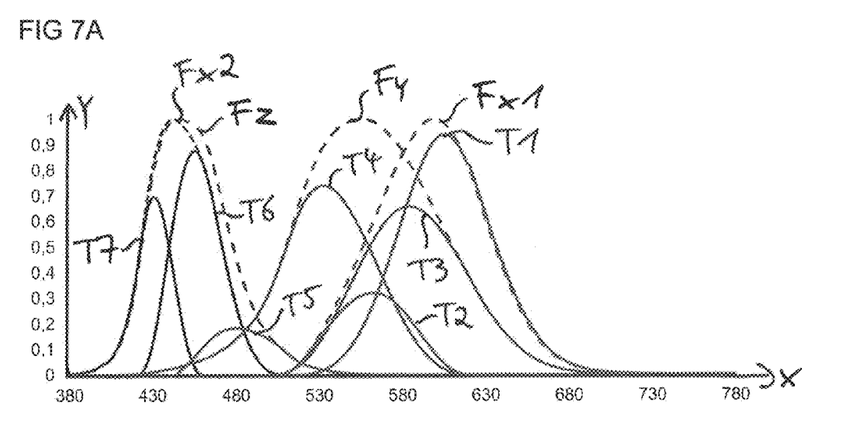
In FIGS. 7A and 7B seven transmission spectra are shown.

In FIG. 7A the four target functions and seven transmission spectra T1, T2, T3, T4, T5, T6, T7 of seven different filters 13 are plotted. The four target functions can be expressed by the seven transmission spectra T1, T2, T3, T4, T5, T6, T7 in the following way:

$$Fx1 = T1 + T2$$

$$Fy = T3 + T4$$

$$Fz = T5 + T6 + T7$$

$$Fx2 = T6 + T7.$$

The first transmission spectrum T1 and the second transmission spectrum T2 overlap with the third transmission spectrum T3 and the fourth transmission spectrum T4.

Figure 7B:
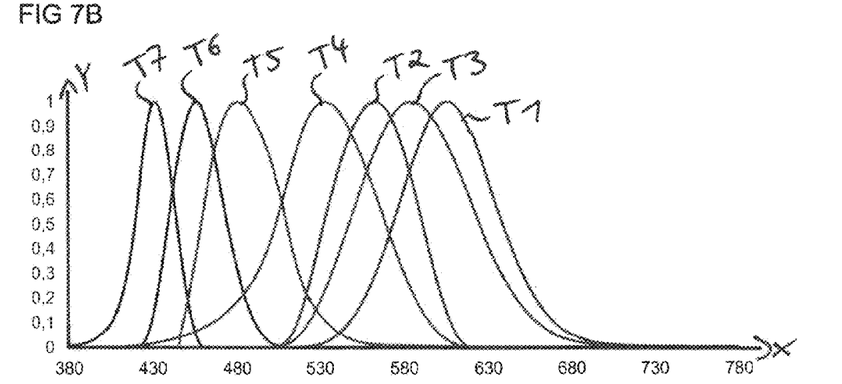

In FIG. 7B the seven transmission spectra T1, T2, T3, T4, T5, T6, T7 shown in FIG. 7A are plotted normalized to 1. These seven transmission spectra T1, T2, T3, T4, T5, T6, T7 of seven filters 13 are set in such a way that each of the three CIE color matching functions $\bar{x}, \bar{y}, \bar{z}$ is a linear combination of the transmission spectra T of at least two of the filters 13.

This means, the three CIE color matching functions $\bar{x}, \bar{y}, \bar{z}$ can be expressed by the following linear combinations:

$$\bar{x} = c1*T1 + c21*T2 + c61*T6 + c71*T7$$

$$\bar{y} = c3*T3 + c4*T4$$

$$\bar{z} = c5*T5 + c62*T6 + c72*T7.$$

Figure 8A:
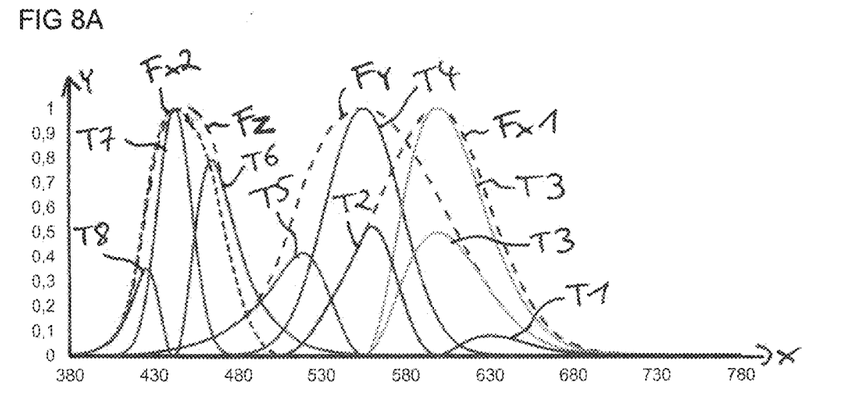
In FIGS. 8A and 8B eight transmission spectra are shown.

In FIG. 8A the four target functions and eight transmission spectra T1, T2, T3, T4, T5, T6, T7, T8 of eight different filters 13 are plotted. The four target functions can be expressed by the eight transmission spectra T1, T2, T3, T4, T5, T6, T7, T8 in the following way:

$$Fx1=T1+T2+T3$$

$$Fy=T3+T4+T5$$

$$Fz=T6+T7+T8$$

$$Fx2=T6+T7+T8.$$

In this case, the fourth target function Fx2 is approximated with the same transmission spectra T6, T7, T8 as the third target function Fz since they only slightly deviate from each other.

Figure 8B:
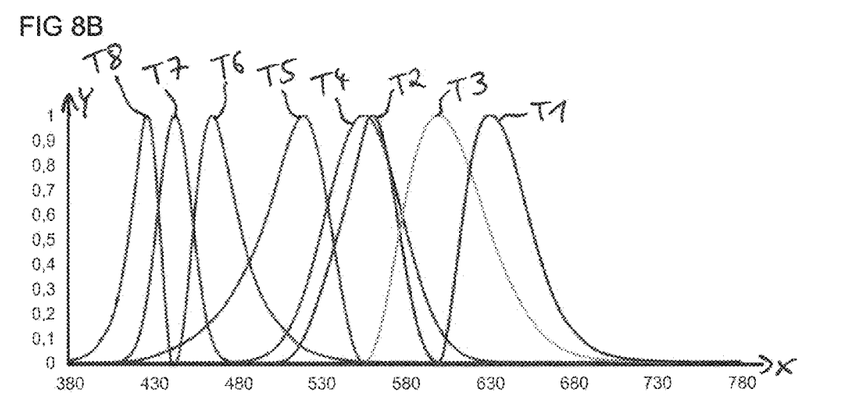

In FIG. 8B the eight transmission spectra T1, T2, T3, T4, T5, T6, T7, T8 shown in FIG. 8A are plotted normalized to 1. These eight transmission spectra T1, T2, T3, T4, T5, T6, T7, T8 of eight filters 13 are set in such a way that each of the three CIE color matching functions $\bar{x}$, $\bar{y}$, $\bar{z}$ is a linear combination of the transmission spectra T of at least two of the filters 13.

This means, the three CIE color matching functions $\bar{x}$, $\bar{y}$, $\bar{z}$ can be expressed by the following linear combinations:

$$\bar{x}=c1*T1+c2*T2+c31*T3+c6*T6+c7*T7+c8*T8$$

$$\bar{y}=c32*T3+c4*T4+c5*T5$$

$$\bar{z}=c6*T6+c7*T7+c8*T8.$$

The third transmission spectrum T3 is employed for the linear combination of the first CIE color matching function $\bar{x}$ and the second color matching function.

Figure 9A:
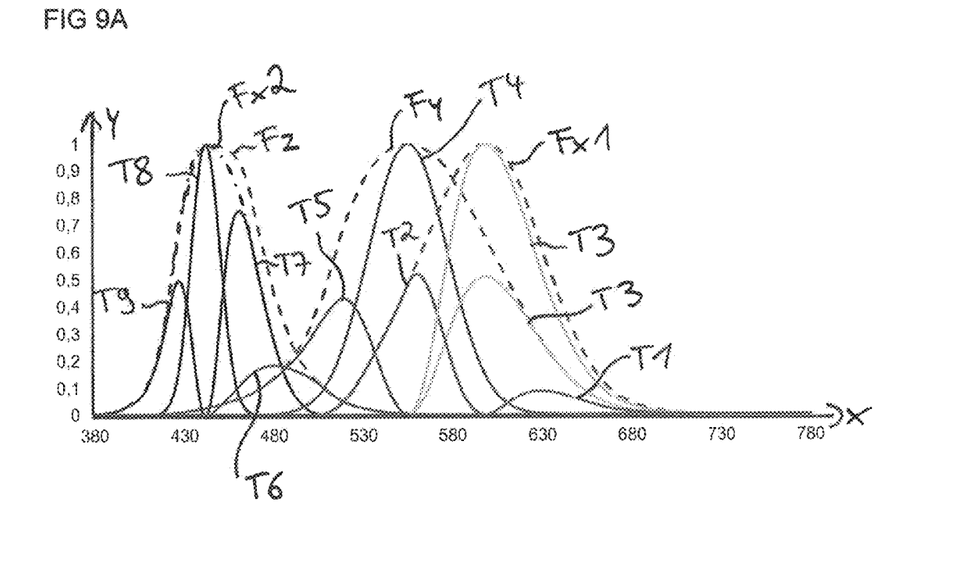
In FIGS. 9A and 9B nine transmission spectra are shown.

In FIG. 9A the four target functions and nine transmission spectra T1, T2, T3, T4, T5, T6, T7, T8, T9 of nine different filters 13 are plotted. The four target functions can be expressed by the nine transmission spectra T1, T2, T3, T4, T5, T6, T7, T8, T9 in the following way:

$$Fx1=T1+T2+T3$$

$$Fy=T3+T4+T5$$

$$Fz=T6+T7+T8+T9$$

$$Fx2=T7+T8+T9.$$

Figure 9B:
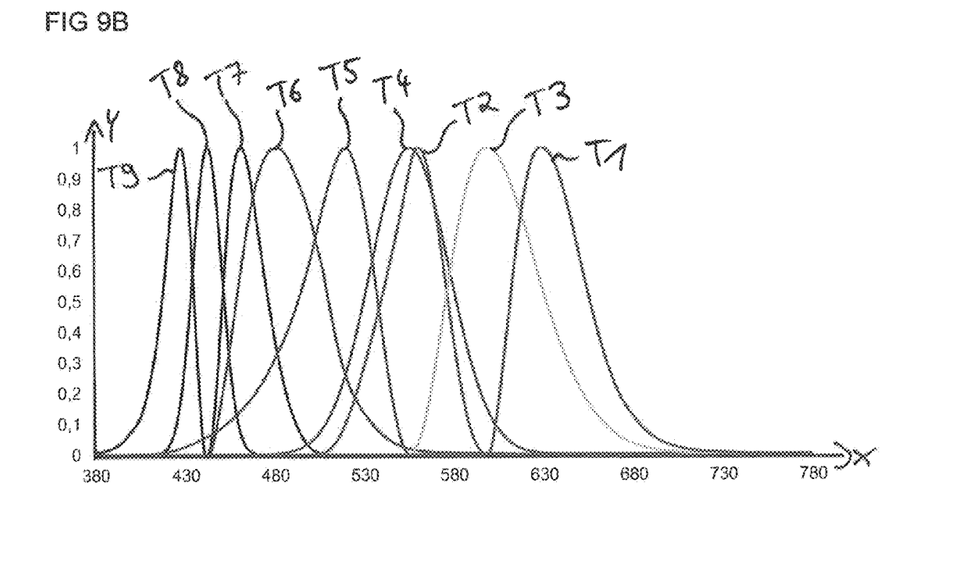

In FIG. 9B the nine transmission spectra T1, T2, T3, T4, T5, T6, T7, T8, T9 shown in FIG. 9A are plotted normalized to 1. These nine transmission spectra T1, T2, T3, T4, T5, T6, T7, T8, T9 of nine filters 13 are set in such a way that each of the three CIE color matching functions $\bar{x}$, $\bar{y}$, $\bar{z}$ is a linear combination of the transmission spectra T of at least two of the filters 13.

This means, the three CIE color matching functions $\bar{x}$, $\bar{y}$, $\bar{z}$ can be expressed by the following linear combinations:

$$\bar{x}=c1*T1+c2*T2+c31*T3+c71*T7+c81*T8+c91*T9$$

$$\bar{y}=c32*T3+c4*T4+c5*T5$$

$$\bar{z}=c6*T6+c72*T7+c82*T8+c92*T9.$$

Figure 10A:
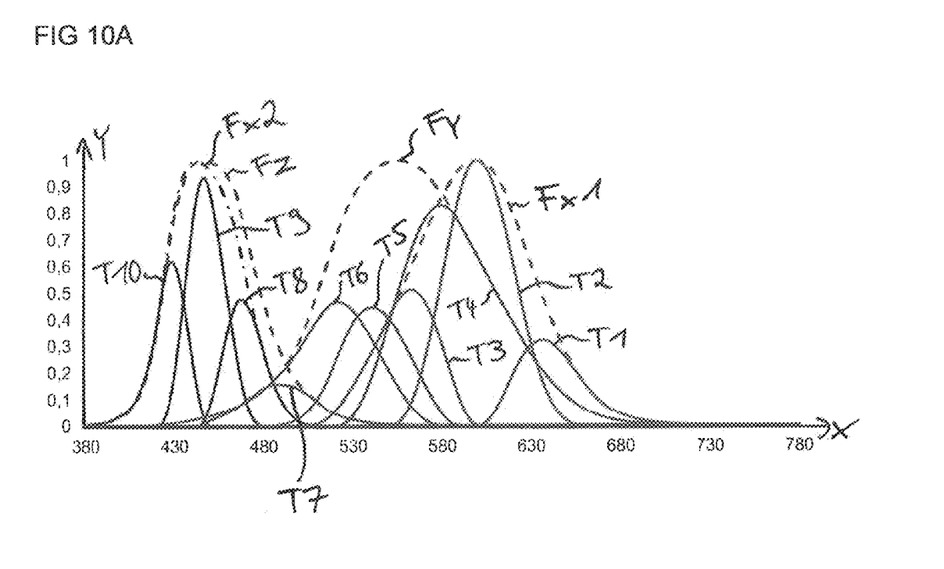
In FIGS. 10A and 10B ten transmission spectra are shown.

In FIG. 10A the four target functions and ten transmission spectra T1, T2, T3, T4, T5, T6, T7, T8, T9, T10 of ten different filters 13 are plotted. The four target functions can be expressed by the ten transmission spectra T1, T2, T3, T4, T5, T6, T7, T8, T9, T10 in the following way:

$$Fx1=T1+T2+T3$$

$$Fy=T4+T5+T6$$

$$Fz=T7+T8+T9+T10$$

$$Fx2=T8+T9+T10$$

Figure 10B:
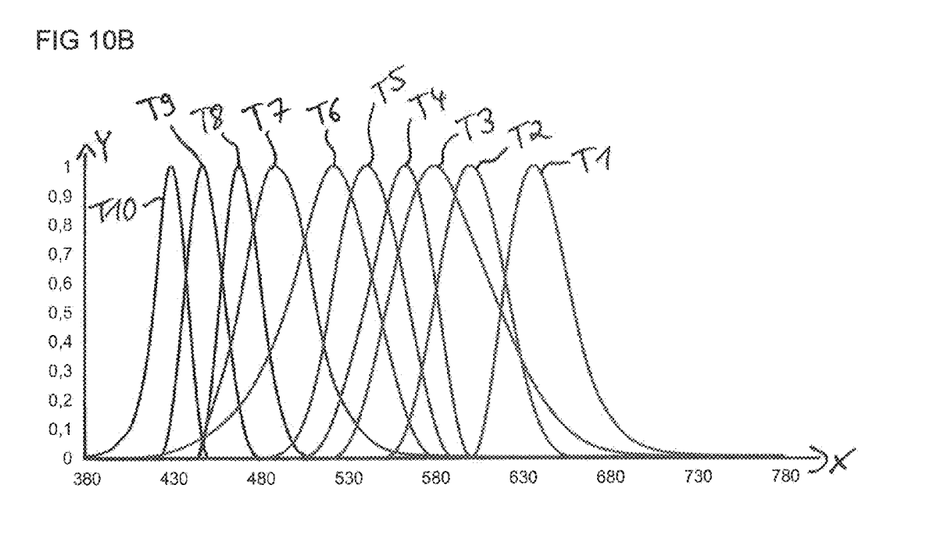

In FIG. 10B the ten transmission spectra T1, T2, T3, T4, T5, T6, T7, T8, T9, T10 shown in FIG. 10A are plotted normalized to 1. These ten transmission spectra T1, T2, T3, T4, T5, T6, T7, T8, T9, T10 of ten filters 13 are set in such a way that each of the three CIE color matching functions $\bar{y}$, $\bar{z}$ is a linear combination of the transmission spectra T of at least two of the filters 13.

This means, the three CIE color matching functions $\bar{x}$, $\bar{y}$, $\bar{z}$ can be expressed by the following linear combinations:

$$\bar{x}=c1*T1+c2*T2+c3*T3+c81*T8+c91*T9+c101*T10$$

$$\bar{y}=c4*T4+c5*T5+c6*T6$$

$$\bar{z}=c7*T7+c82*T8+c92*T9+c102*T10.$$

With an increasing number of detection channels 11 of the optical sensor 10 the spectral resolution of the optical sensor 10 increases.

The invention claimed is:

1. An optical sensor operable for color measurement and spectrum reconstruction, the optical sensor comprising:
   at least four detection channels, where each detection channel comprises a photodetector and a filter with a respective transmission spectrum, wherein:
      the transmission spectra of the at least four filters are different from one another,
      the transmission spectra are set such that each of the three CIE color matching functions is identical to a linear combination of the transmission spectra of at least two of the filters, and
      the transmission spectra partially overlap with each other and are distributed over the whole visible range of the electromagnetic spectrum.

2. The optical sensor according to claim 1, wherein each transmission spectrum is assigned a scaling factor for at least one linear combination yielding one of the CIE color matching functions.

3. The optical sensor according to claim 1, wherein the wavelength of maximum transmission is at least 380 nm and at most 780 nm for each filter.

4. The optical sensor according to claim 1, wherein the wavelengths of maximum transmission of the filters are equally spaced from each other.

5. The optical sensor according to claim 4, wherein the transmission spectra of the filters are linearly independent.

6. The optical sensor according to claim 1, wherein the transmission spectra are set such that at least one transmission spectrum is employed for the linear combinations of two CIE color matching functions.

7. The optical sensor according to claim 1, wherein the filters are one of the following:
   interference filters,
   absorption filters,
   plasmonic filters.

8. The optical sensor according to claim 1, wherein the filters are a combination of at least two of the following:
   interference filters,
   absorption filters,
   plasmonic filters.

9. A method for detecting electromagnetic radiation, the method comprising:

providing an optical sensor which comprises at least four detection channels, where each detection channel comprises a photodetector, providing a filter with a transmission spectrum for each detection channel, where the transmission spectra of the at least four filters are different from one another, partially overlap each other, and are distributed over the whole visible range of the electromagnetic spectrum, such that each of the three CIE color matching functions is identical to a linear combination of the transmission spectra of at least two of the filters, detecting electromagnetic radiation to be emitted from a light source with the optical sensor, where each detection channel detects a fraction of the electromagnetic radiation in a range of wavelengths that is within the transmission spectrum of the respective filter and where each detection channel provides a channel signal, determining from the channel signals a tristimulus value of the electromagnetic radiation, and reconstructing by means of suitable mathematical algorithms and/or matrix interpolation operations from the channel signals the spectrum of the electromagnetic radiation.

10. The method according to claim 9, wherein each transmission spectrum is assigned a scaling factor for at least one linear combination yielding one of the CIE color matching functions.

11. The method according to claim 10, wherein at least two channel signals are multiplied with the respective scaling factors of the transmission spectra of the filters of the respective detection channels and added to give a tristimulus value.

12. The method according to claim 9, wherein the linear combination of the transmission spectra of at least two of the filters is the sum of at least two transmission spectra that are multiplied with their respective scaling factors.

13. The method according to claim 9, wherein the channel signal of each detection channel comprises the intensity of electromagnetic radiation detected by the respective detection channel.

14. The method according to claim 9, wherein at least one channel signal is employed for determining two tristimulus values.

15. The method according to claim 9, wherein a color measurement is provided which is based on the CIE color matching functions.

16. The method according to claim 9, wherein the three tristimulus values are determined.

17. The method according to claim 9, wherein the wavelength of maximum transmission of at least one transmission spectrum is equal to the wavelength of maximum sensitivity of one of the CIE color matching functions.

18. The method according to claim 9, wherein at least two channel signals are employed for reconstructing the spectrum of the detected electromagnetic radiation.

19. The method according to claim 9, further comprising determining a remission, wherein determining the remission comprises reconstructing from at least two channel signals the spectral composition of the detected electromagnetic radiation; and determining from the spectral composition the color impression of the light source.

* * * * *